United States Patent
Costello

(10) Patent No.: US 7,289,443 B1
(45) Date of Patent: *Oct. 30, 2007

(54) SLOW-START PACKET SCHEDULING PARTICULARLY APPLICABLE TO SYSTEMS INCLUDING A NON-BLOCKING SWITCHING FABRIC AND HOMOGENEOUS OR HETEROGENEOUS LINE CARD INTERFACES

(75) Inventor: Patrick A. Costello, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 868 days.

This patent is subject to a terminal disclaimer.

(21) Appl. No.: 10/684,282

(22) Filed: Oct. 10, 2003

Related U.S. Application Data

(63) Continuation-in-part of application No. 10/109,785, filed on Mar. 30, 2002, now Pat. No. 7,184,443.

(51) Int. Cl.
*H04L 12/56* (2006.01)

(52) U.S. Cl. ............ 370/231; 370/252; 370/413; 370/429

(58) Field of Classification Search ........ 370/229–231, 370/399, 461, 462, 395.42, 389, 412, 390, 370/252, 413, 428, 429; 455/428
See application file for complete search history.

(56) References Cited

U.S. PATENT DOCUMENTS

| | | | |
|---|---|---|---|
| 4,733,390 A | 3/1988 | Shirakawa et al. | 370/461 |
| 5,500,858 A | 3/1996 | McKeown | 370/412 |
| 5,923,644 A | 7/1999 | McKeown et al. | 370/230 |
| 6,212,182 B1 | 4/2001 | McKeown | 370/390 |
| 6,253,080 B1 * | 6/2001 | Wiedeman et al. | 455/428 |
| 6,262,986 B1 | 7/2001 | Oba et al. | 370/399 |
| 6,757,246 B2 | 6/2004 | Alasti et al. | 370/230 |

(Continued)

FOREIGN PATENT DOCUMENTS

EP 1052814 A 11/2000

(Continued)

OTHER PUBLICATIONS

U.S. Appl. No. 10/109,785, filed Mar. 30, 2002, Bonomi et al.

(Continued)

*Primary Examiner*—John Pezzlo
(74) *Attorney, Agent, or Firm*—The Law Office of Kirk D. Williams

(57) ABSTRACT

Methods and apparatus are disclosed for slow-start scheduling packets, such as in systems having a non-blocking switching fabric and homogeneous or heterogeneous line card interfaces. In one implementation, multiple request generators, grant arbiters, and acceptance arbiters work in conjunction to determine the scheduling of packets. A set of requests for sending packets from a particular input is identified. The number of requests is possibly reduced to a value less than the number of packets that can be sent from the particular source if the particular input is not saturated. Otherwise, when the particular input is saturated, the number of requests remains the same or is reduced to the maximum number of packets that can be sent during a packet time.

14 Claims, 17 Drawing Sheets

SLOW-START THROTTLING
OF REQUESTS

U.S. PATENT DOCUMENTS

| | | | |
|---|---|---|---|
| 2001/0043606 A1 | 11/2001 | Han et al. | 370/395.1 |
| 2003/0032391 A1* | 2/2003 | Schweinhart et al. | 455/12.1 |
| 2003/0072326 A1 | 4/2003 | Alasti et al. | 370/462 |
| 2004/0165598 A1 | 8/2004 | Shrimali et al. | 370/395.42 |
| 2004/0218600 A1 | 11/2004 | Alasti et al. | 370/389 |

FOREIGN PATENT DOCUMENTS

| | | |
|---|---|---|
| WO | WO 03/085909 | 10/2003 |

OTHER PUBLICATIONS

U.S. Appl. No. 10/339,032, filed Jan. 9, 2003, Earl T. Cohen.

Nick McKeown, *The iSlip Scheduling Algorithm for Input-Queued Switches*, IEEE/ACM Transactions on Networking, vol. 7, No. 2, Apr. 1999, pp. 188-201.

McKeown et al., *Tiny Tera: A Packet Switch Core*, IEEE Micro, vol. 17, Issue 1, Jan.-Feb. 1997, pp. 26-33.

Nick McKeown and Thomas E. Anderson, *A Quantitative Comparison of Scheduling Algorithms for Input-Queued Switches*, Computer Networks and ISDN Systems, vol. 30, No. 24, pp. 2309-2326, Dec. 1998.

Pankaj Gupta and Nick McKeown, *Designing and Implementing a Fast Crossbar Scheduler*, IEEE Micro, vol. 19, Issue 1, Jan.-Feb. 1999, pp. 20-28.

Wenzhe Cui et al., "A threshold based scheduling algorithm for input queue switch," IEEE, 2001, pp. 207-212.

Chao H J et al., "Centralized contention resolution schemes for a large-capacity optical ATM switch," ATM Workshop Proceedings, 1998 IEEE, Fairfax, VA, USA pp. 11-16, May 26, 1998.

* cited by examiner

PACKET INDICATION
PROCESSING

GENERATE REQUESTS

**SLOW-START THROTTLING
OF REQUESTS

GRANT PROCESSING

ACCEPTANCE PROCESSING

MULTICAST POINTER PROCESSING

SLOW-START PACKET SCHEDULING PARTICULARLY APPLICABLE TO SYSTEMS INCLUDING A NON-BLOCKING SWITCHING FABRIC AND HOMOGENEOUS OR HETEROGENEOUS LINE CARD INTERFACES

CROSS-REFERENCE TO RELATED APPLICATIONS

This is a continuation-in-part of application Ser. No. 10/109,785, filed Mar. 30, 2002 now U.S. Pat. No. 7,184,443, and hereby incorporated by reference.

FIELD OF THE INVENTION

This invention especially relates to communications and computer systems; and more particularly, the invention relates to slow-start packet scheduling particularly applicable, but not limited to systems including a non-blocking switching fabric and homogeneous or heterogeneous line card interfaces.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

SLIP is an iterative algorithm for scheduling the sending of packets across an N×N switch. In one implementation, the following three steps are performed:
 1. Each unmatched input sends a request to every output for which it has a queued cell.
 2. If an unmatched output receives any requests, it chooses the one that appears next in a fixed, round-robin schedule starting from the highest selection priority element. The output notifies each input whether or not its request was granted. The pointer to the highest selection priority element of the round-robin schedule is incremented (modulo N) to one location beyond the granted input if and only if the grant is accepted in step 3 of the first iteration. The pointer is not incremented in subsequent iterations.
 3. If an input receives a grant, it accepts the one that appears next in a fixed, round-robin schedule starting from the highest selection priority element. The pointer to the highest selection priority element of the round-robin schedule is incremented (modulo N) to one location beyond the accepted output.

I-SLIP is a scheduling algorithm including multiple iterations of the SLIP algorithm to determine the scheduling of packets for each round of sending packets (rather than just one SLIP iteration.)

Each output scheduler decides among the set of ordered, competing requests using a rotating selection priority. When a requesting input is granted and the input accepts that grant, the input will have the lowest selection priority at that output in the next cell time. Also, whatever input has the highest selection priority at an output will continue to be granted during each successive time slot until it is serviced. This ensures that a connection will not be starved: the highest selection priority connection at an output will always be accepted by an input in no more than N cell times.

Moving the pointers not only prevents starvation, it tends to desynchronize the schedulers. Each of the outputs that matched in the previous time slot will have a different highest selection priority input. Thus, they will each grant to different inputs. Consider an example in which two inputs are both requesting the same two outputs. Initially, both outputs may grant to the same input; in that case only one connection will be made in the first iteration.

The successful output will increment its pointer and in the next cell time, the outputs will no longer contend: one will have moved on to grant to another input and the other will grant to the same input as before. This leads to a better match in the first iteration of the next cell time. This is because the output schedulers have become desynchronized (or "slipped") with respect to each other. This leads to high performance, even for a single iteration of SLIP.

Because of the round-robin movement of the pointers, the algorithm tends to provide a fair allocation of bandwidth among competing connections and to be burst-reducing. The burst-reduction is simplest to understand under high load when all input queues are occupied: the algorithm will visit each competing connection in turn, so that even if a burst of cells for the same output arrives at the input, the burst will be spread out in time if there is competing traffic.

An example implementation is described in Nicholas W. McKeown, "Method and Apparatus for Scheduling Cells in an Input-Queued Switch", U.S. Pat. No. 5,500,858, issued Mar. 19, 1996, which is hereby incorporated by reference. Another example implementation is described in Nicholas W. McKeown, "Combined Unicast and Multicast Scheduling," U.S. Pat. No. 6,212,182, issued Apr. 3, 2001, which is hereby incorporated by reference.

However, the I-SLIP algorithm is designed to accommodate cross-bar switching fabrics wherein the input ports are independent and homogenous. Certain implementations of non-blocking switching fabrics have heterogeneous line cards of varying capacities. Desired for these systems are schedulers that provide a reasonably fair bandwidth allocation across line cards of varying capacity, independently of the line card configuration. Even in systems wherein line cards of varying speeds are connected to a proportional increase in the number of input ports, the I-SLIP scheduling algorithm typically does not provide a sufficiently fair bandwidth allocation. Needed are new methods and apparatus for scheduling packets across a non-blocking switching fabric and homogeneous or heterogeneous line card interfaces.

SUMMARY OF THE INVENTION

Methods and apparatus are disclosed for slow-start scheduling packets, such as in systems having a non-blocking switching fabric and homogeneous or heterogeneous line card interfaces. In one embodiment, multiple request generators, grant arbiters, and acceptance arbiters work in conjunction to determine the scheduling of packets. A set of requests for sending packets from a particular input is identified. The number of requests is possibly reduced to a value less than the number of packets that can be sent from the particular source if the particular input is not saturated. In one embodiment, the particular input is saturated, the number of requests remains the same or is reduced to the maximum number of packets that can be sent during a packet time.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
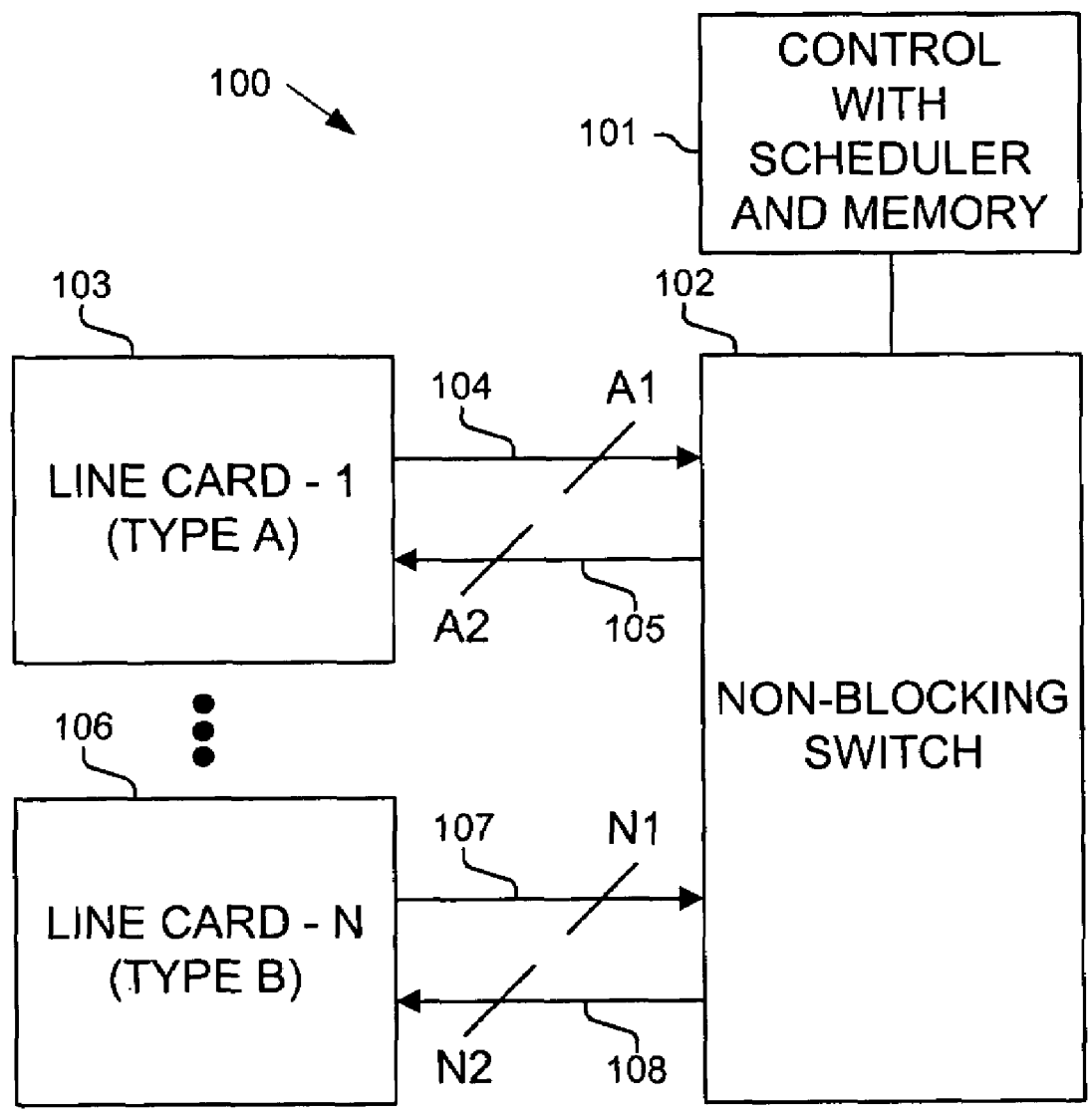
FIGS. 1A-E and 2 are block diagrams of embodiments scheduling packets in a system having a non-blocking switching fabric.

Methods and apparatus are disclosed for scheduling packets in systems, such as, but not limited to systems having a non-blocking switching fabric and homogeneous or heterogeneous line card interfaces.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Methods and apparatus are disclosed for scheduling packets in systems, such as, but not limited to systems having a non-blocking switching fabric and homogeneous or heterogeneous line card interfaces. In one embodiment, multiple request generators, grant arbiters, and acceptance arbiters work in conjunction to determine this scheduling. A set of requests for sending packets from a particular input is generated. From a grant starting position, a first n requests in a predetermined sequence are identified, where n is less than or equal to the maximum number of connections that can be used in a single packet time to the particular output. The grant starting position is updated in response to the first n grants including a particular grant corresponding to a grant advancement position. In one embodiment, the set of grants generated based on the set of requests is similarly determined using an acceptance starting position and an acceptance advancement position.

In one embodiment, a "packet time" is a time interval for a given switch configuration during which one or more packets can be sent from one or more inputs to one or more outputs. In one embodiment, the packet time corresponds to the scheduling time interval required or allocated to perform the scheduling of packets, and thus, packets can be sent while the packet scheduling and corresponding switch configuration are being determined for the next packet time.

In one embodiment, multiple request generators, grant arbiters, and acceptance arbiters work in conjunction to determine the scheduling of packets. A set of requests for sending packets from a particular input is identified. The number of requests is reduced to a value less than the number of packets that can be sent from the particular source if the particular input is not saturated. In one embodiment, the particular input is saturated, the number of requests remains the same or is reduced to the maximum number of packets that can be sent during a packet time.

In one embodiment, a set of requests corresponding to packets desired to be sent from a plurality of inputs across a packet switch to a particular output are identified, the set of requests including j requests from a particular source with the ability to send k packets during a particular packet time and having a saturation level of s packets. The value of j is slow-start adjusted to a slow-start value, wherein the slow-start value is less than said k when a number of packets corresponding to the particular source is less than said s. A grant starting position is maintained. A grant advancement position is determined. A first n requests in a predetermined sequence starting from the grant starting position are identified, where n is less than or equal to the maximum number of packets that can be sent in a single packet time to the particular output; and wherein the first n requests include the slow-start value number of requests from the particular source. The grant starting position is updated in response to the first n grants including a particular grant corresponding to the grant advancement position.

In one embodiment, the slow-start adjusting the value of said j to the slow-start value includes setting the slow-start value to said k when the number of packets corresponding to the particular source is greater than said s. In one embodiment, the slow-start adjusting the value of said j to the slow-start value includes a division or shift operation by a predetermined value on said j when the number of packets corresponding to the particular source is less than said s. In one embodiment, the slow-start adjusting the value of said j to the slow-start value includes identifying the slow-start value in a data structure based on the value of said j.

FIG. 1 illustrates one embodiment of a system 100 including a non-blocking switch (or switch fabric) 102, a control with scheduler and memory 101, and multiple line cards 103-106. Line card 103 is denoted as being of "type A" with A1 ingress links or ports 104 and A2 egress links or ports 105. Line card 106 is denoted as being of "type B" with N1 ingress links or ports 107 and N2 egress links or ports 108. This labeling emphasizes that interfaces and line cards with varying rates and numbers of ports or connections to a non-blocking switch 102 are supported.

Figure 1B:
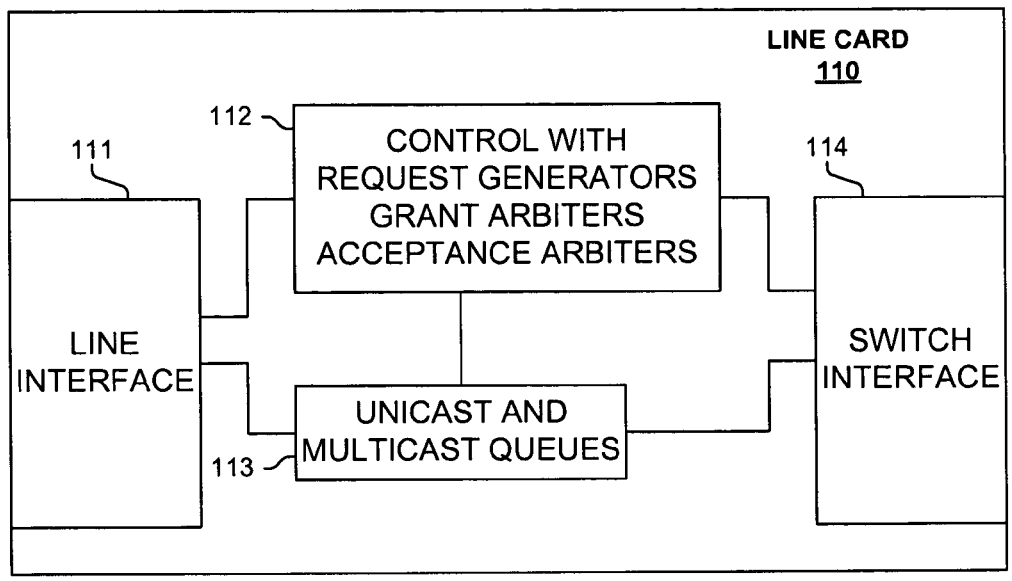

FIG. 1B illustrates one embodiment of a line card 110. Signals including packets or other data formats are received and transmitted by line interface 111. Shown are unicast and multicast queues 113, wherein incoming packets to be scheduled are placed in one embodiment. Control with request generators, grant arbiters, and acceptance arbiters 112 determines and schedules packets as described hereinafter, with packets being sent from unicast and multicast queues 113 at their respective scheduled times via switch interface 114. Additionally, scheduling requests, grants, and acceptances are communicated among other request generators, grant arbiters, and acceptance arbiters via switch interface 114.

Figure 1C:
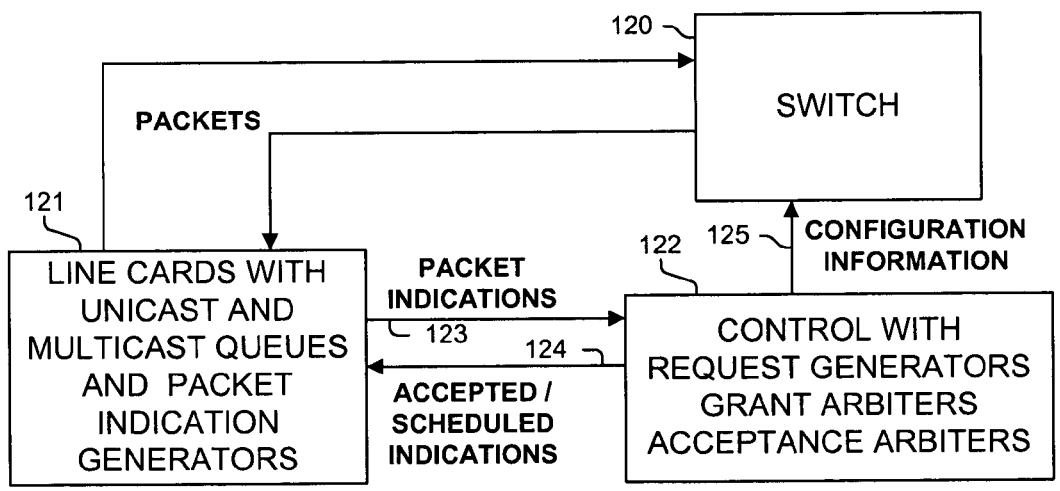

FIG. 1C illustrates one embodiment wherein the request generators, grant arbiters, and acceptance arbiters are centrally located in control with request generators, grant arbiters and acceptance arbiters 122. Line cards with unicast and multicast queues and packet indication generators 121 send packet traffic indications 123 to control with request generators, grant arbiters and acceptance arbiters 122. Returned are acceptance/schedule indications 124 of packets to line cards 121, which initiate the sending of the accepted packets at the scheduled time. Additionally, control with request generators, grant arbiters and acceptance arbiters 122 sends configuration information 125 to switch 120, so the switching fabric can be configured to communicated the accepted packets between the switch input and output ports and connected line cards 121.

Figure 1D:
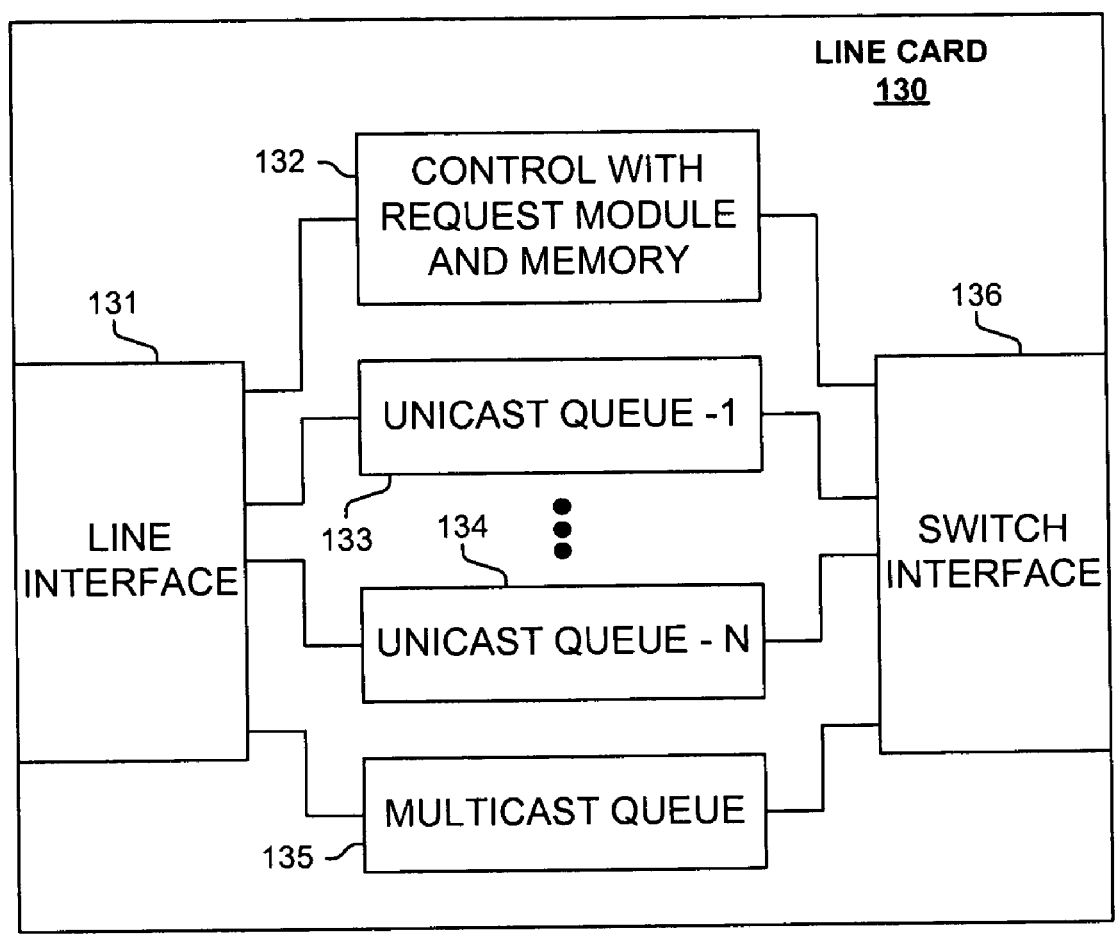

FIG. 1D illustrates one embodiment of a line card 130. Signals including packets or other data formats are received and transmitted by line interface 131. Shown are N unicast queues 133-134 and one multicast queue 135, wherein incoming packets to be scheduled are placed. Typically, N corresponds to the number of output line cards or the number of switch output ports to which the line card can send packets. In one embodiment, additional queues are used, such as, but not limited to multiple multicast queues and queues for buffering packets having various priority levels. Control with request module and memory 132 sends packet indications and receives acceptance and scheduling indications via switch interface 136.

Figure 1E:
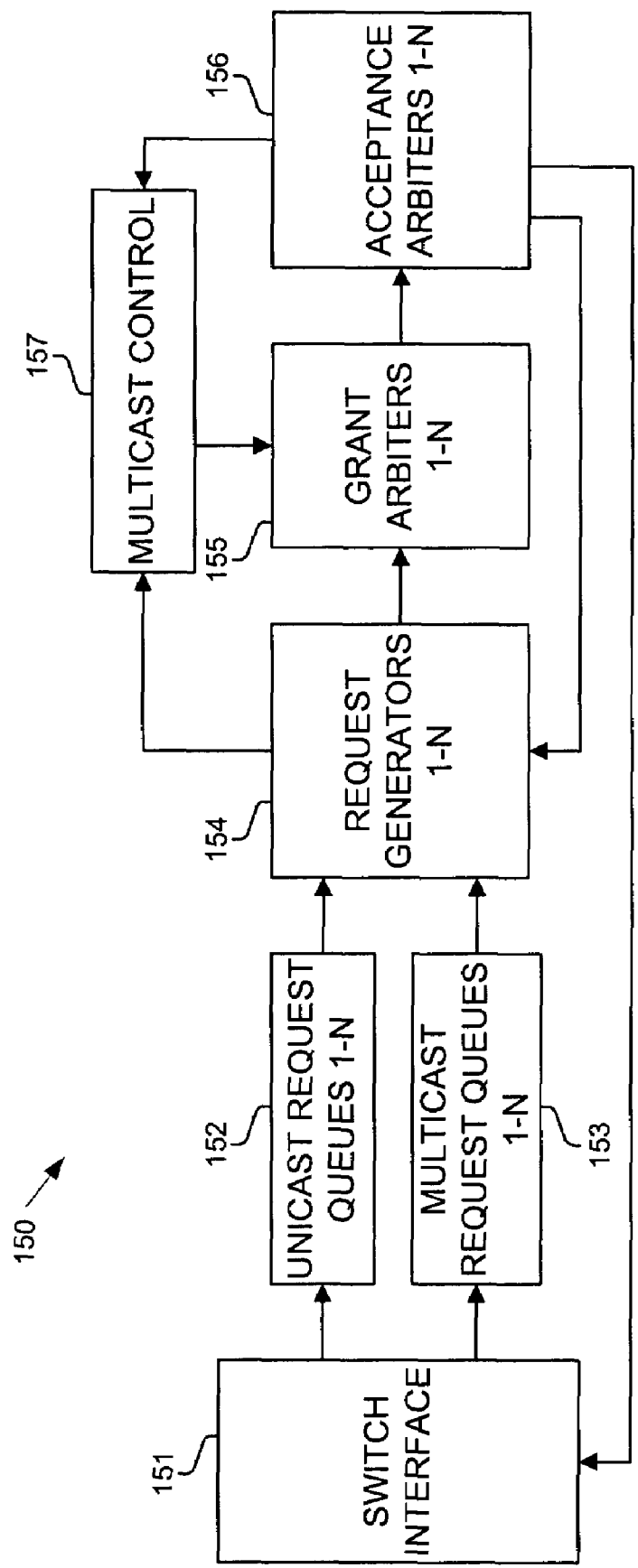

FIG. 1E illustrates a system 150 including a N request generators 154, grant arbiters 155, and acceptance arbiters 156. Packet indications are received from various line cards via switch interface 151 and stored in the corresponding queue of the N unicast queues 152 and N multicast request queues 153. The N request generators 154, based on the packet indications in queues 152 and 153, generate unicast and multicast packet requests (typically in separate iterations) and communicate to the grant arbiters corresponding to the destination of the packets of the N grant arbiters 155. The N grant arbiters 155 in turn generate and communicate their grants to the acceptance arbiters corresponding to the source of the granted packets of the N acceptance arbiters 156. The acceptances are then, or after multiple iterations, communicated to switch interface 151 for relaying to the appropriate line cards and switch configuration control. In one embodiment, a multicast control 157 is used maintain a common multicast position used by grant arbiters 155 in selecting which multicast requests to grant.

Figure 2:
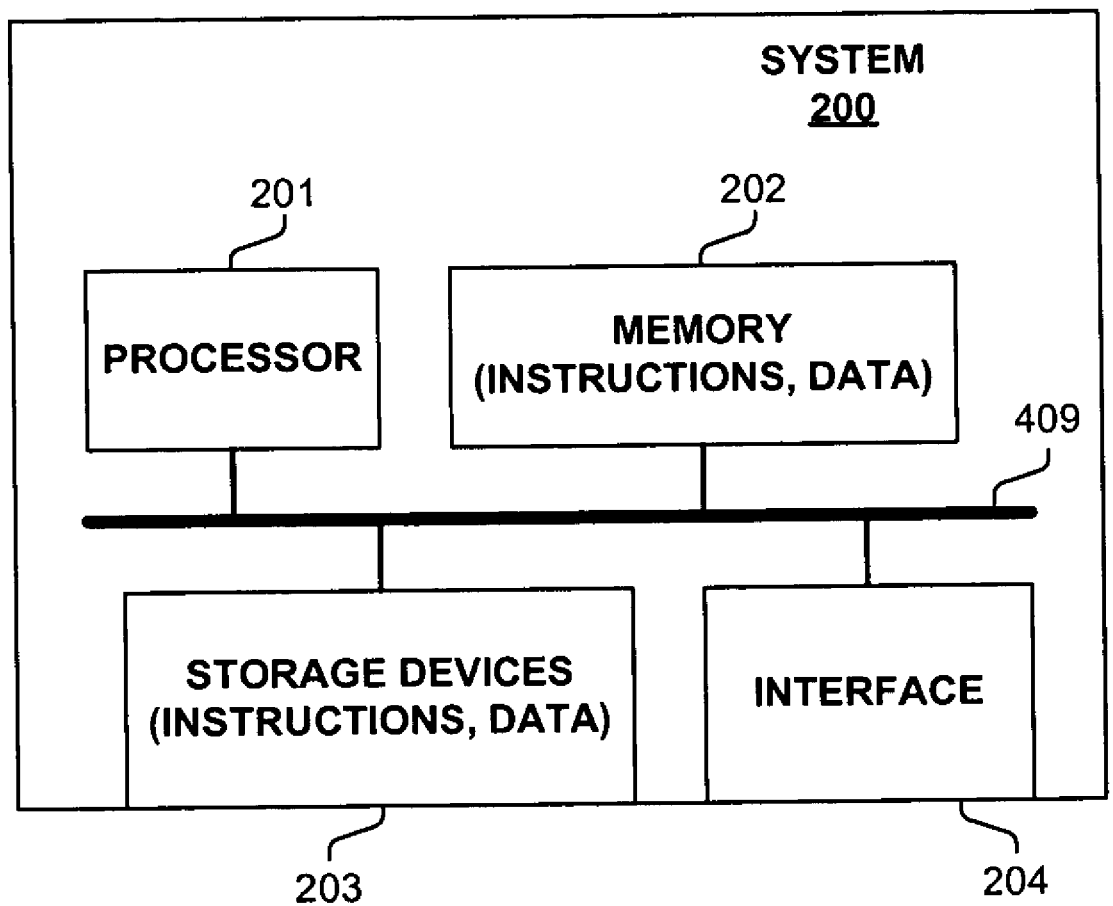

FIG. 2 illustrates one embodiment of a system 200, which may include, but is not limited to one or more request generators, grant arbiters and/or acceptance arbiters for scheduling packets according to the invention. In one embodiment, system 200 includes a processor 201, memory 202, storage devices 203, and switch/control interface 204, which are typically coupled via one or more communications mechanisms 209 (shown as a bus for illustrative purposes.) Various embodiments of system 200 may include more or less elements. The operation of system 200 is typically controlled by processor 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processor 201 and/or data which is manipulated by processor 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processor 201 and/or data which is manipulated by processor 201 for implementing functionality in accordance with the invention.

Figure 3A:
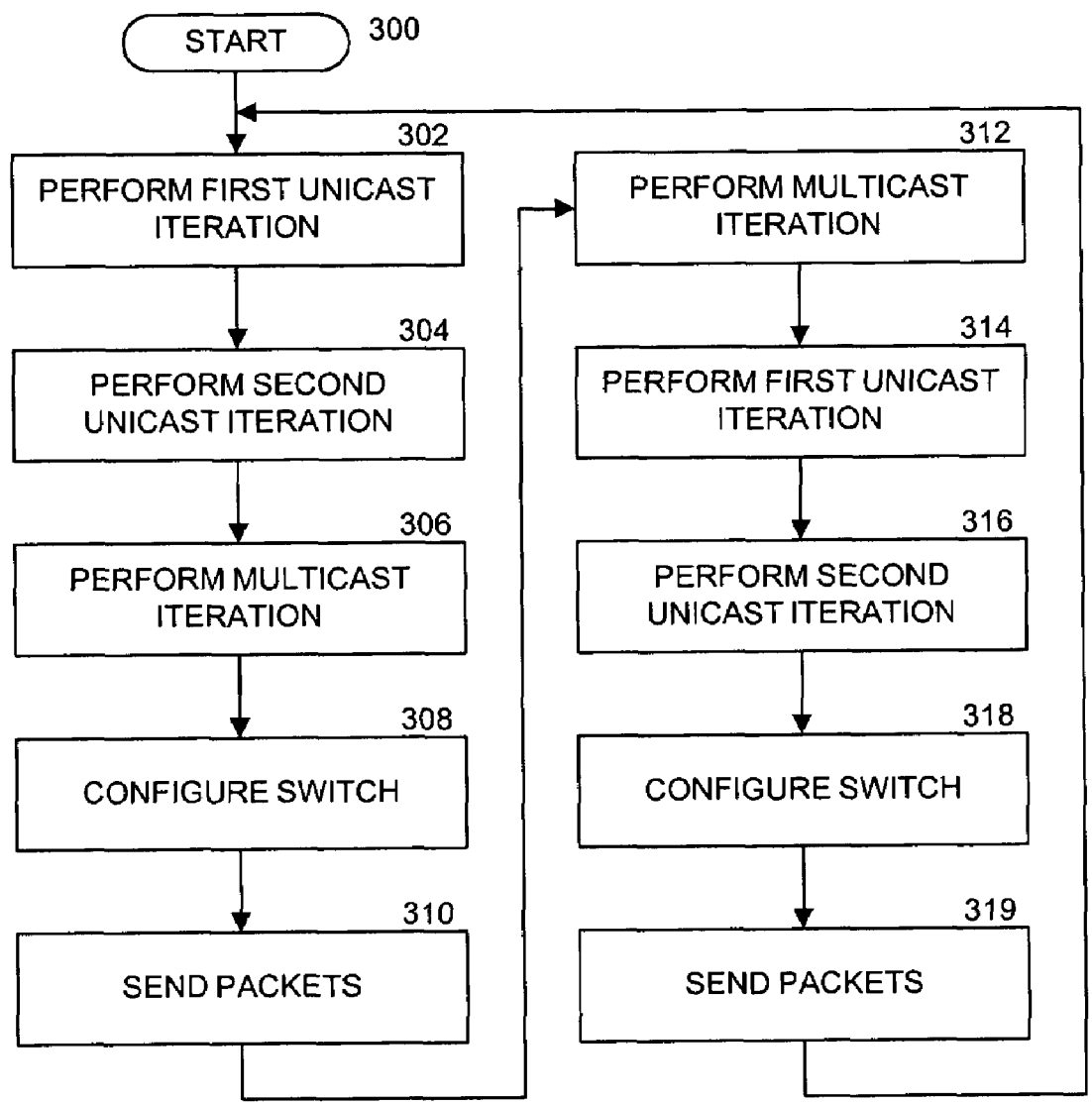
FIG. 3A is a flow diagram of a process used in one embodiment for scheduling unicast and multicast packets in three iteration scheduling cycles.

FIG. 3A illustrates a process used in one embodiment for scheduling packets using three scheduling iterations. Processing begins in process block 300, and proceeds to process block 302, wherein a first unicast scheduling iteration is performed. Next, in process block 304, a second unicast scheduling iteration is performed. In process block 306, a multicast scheduling iteration is performed. Next, in process block 308, the switch (and its switching fabric) are configured according to the scheduled packets, and in process block 310, the packets are sent. For the next scheduling round, processing proceeds to process block 312, wherein a multicast scheduling iteration is performed. Next, in process block 314, a first unicast scheduling iteration is performed. In process block 316, a second unicast scheduling iteration is performed. Next, in process block 318, the switch (and its switching fabric) are configured according to the scheduled packets, and in process block 319, the packets are sent. Processing returns to process block 302 to perform more scheduling of packets.

Figure 3B:
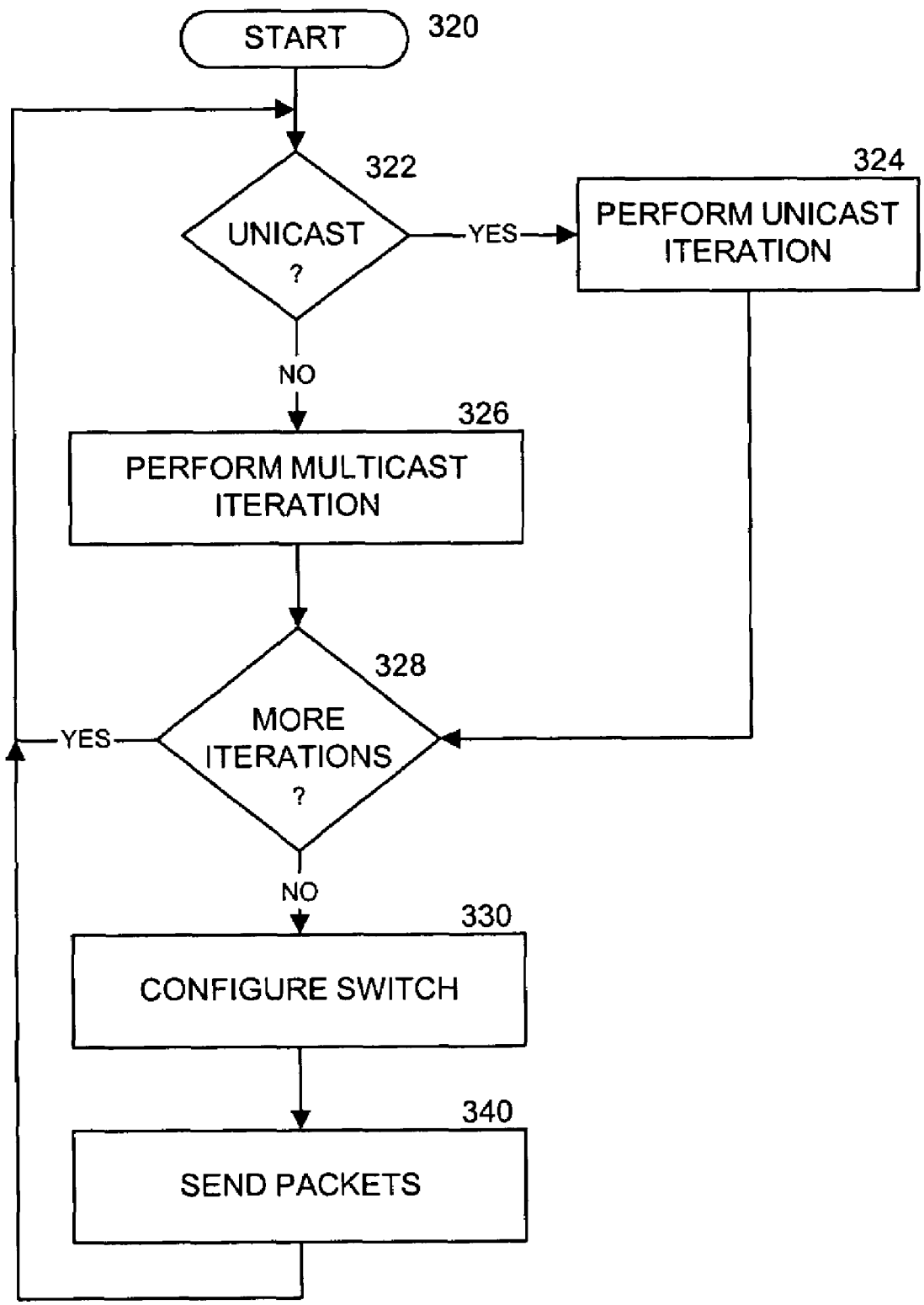
FIG. 3B is a flow diagram of a process used in one embodiment for scheduling unicast and/or multicast packets in one or more iterations.

FIG. 3B illustrates a process used in one embodiment for scheduling packets using one or more scheduling iterations, including unicast and/or multicast iterations in any desired order. Processing begins with process block 320. As determined in process block 322, if a unicast iteration is next, then in process block 324, the unicast scheduling iteration is performed; otherwise, a multicast scheduling iteration is performed in process block 326. As determined in process block 328, if there are more scheduling iterations to be performed for this scheduling cycle, then processing returns to process block 322 to perform the next scheduling iteration. Otherwise, the switch is configured in process block 330, packets are sent in process block 340, and processing then returns to process block 322.

Figure 4A:
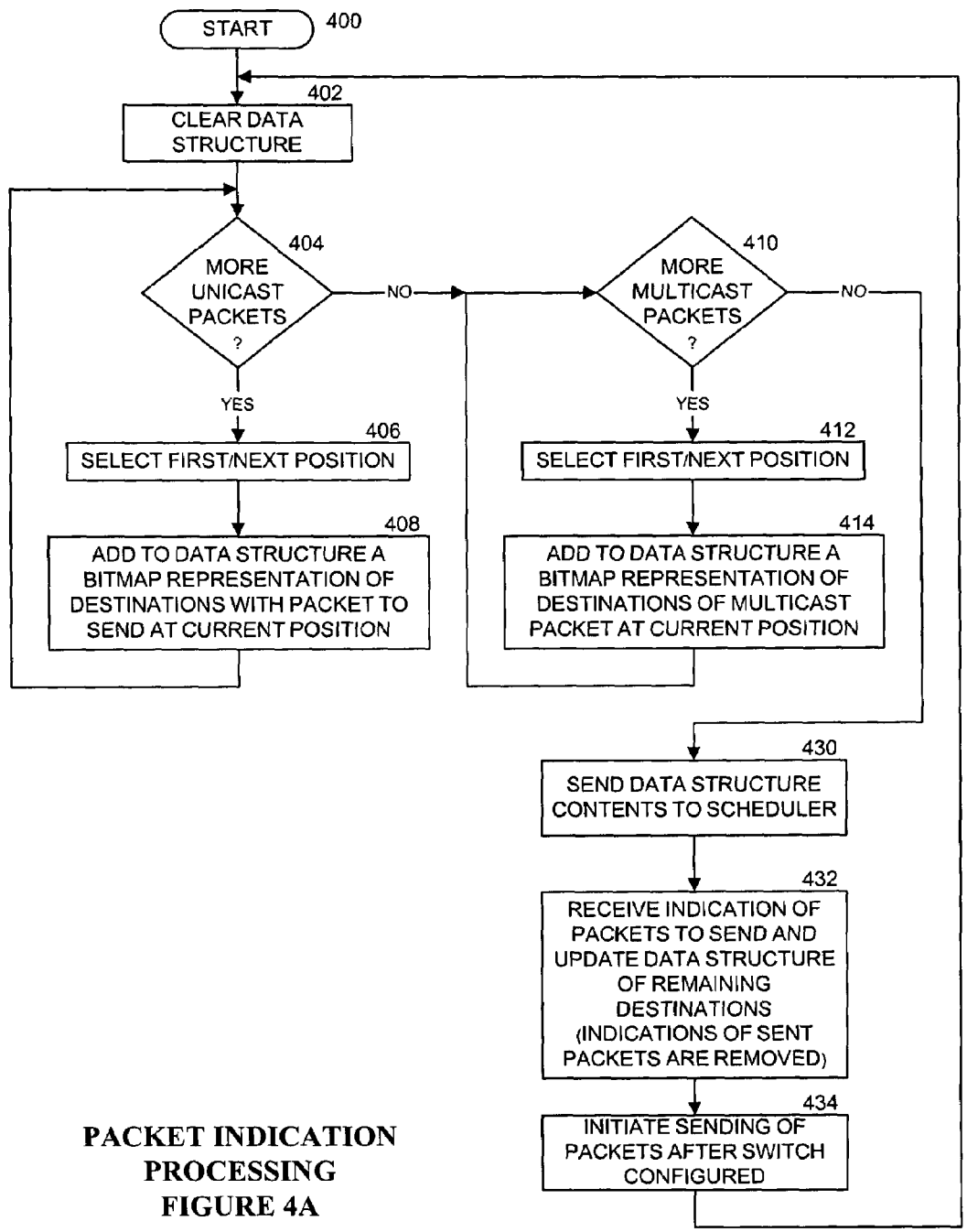
FIGS. 4A and 4C are flow diagrams of processes used in one embodiment for communicating unicast and multicast packet indications to a scheduler.

FIG. 4A illustrates a process used in one embodiment to generate packet indication messages. Processing begins with process block 400, and proceeds to process block 402, wherein a packet indication data structure is cleared. As determined in process block 404, if there are more unicast packets to be sent, then a first or next position in the unicast queues is selected in process block 406. In process block 408, a bitmap or other representation of the destination or destinations of the packets at the selected position in the destination queues is added to the data structure, and processing returns to process block 404. In one embodiment for unicast and/or multicast packets, if a particular destination is disabled, out of service, or currently unreachable based on backpressure or other flow control information, indications for this destination are not added to the data structure in process blocks 408 or 414.

Otherwise, as determined in process block 410, if there are more multicast packets to be sent, then a first or next position in the multicast queue is selected in process block 412. In process block 414, a bitmap or other representation of the destinations of the multicast packet at the selected position in the multicast queue is added to the data structure, and processing returns to process block 410.

Otherwise, the data structure is sent to the scheduler in process block 430. In process block 432, indications are received from the scheduler of which packets to send and the multicast queues are updated if less than all destinations of a particular packet are allowed. The sending of these packets is initiated in process block 434. Processing returns to process block 402.

Figure 4B:
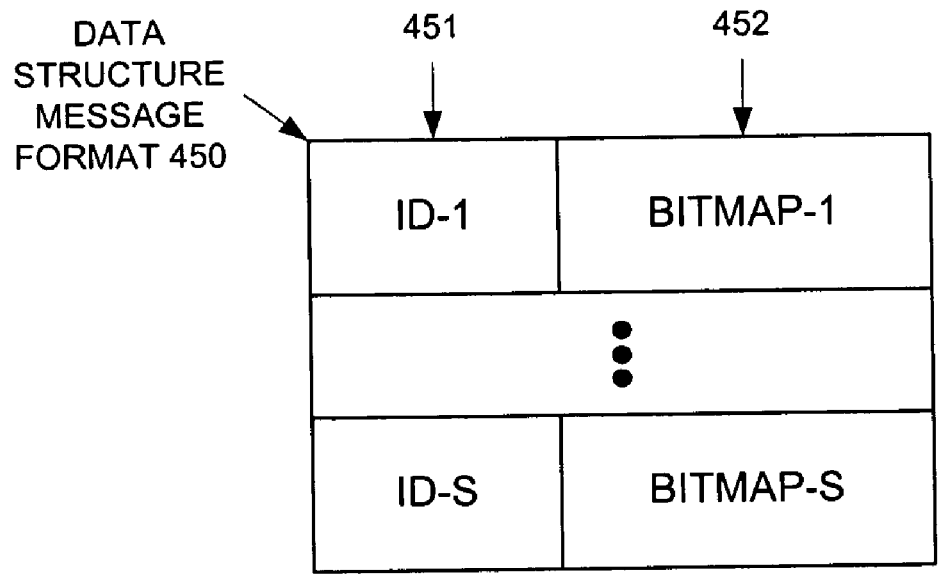
FIG. 4B is a block diagram of a message format used in one embodiment for communicating unicast and multicast packet indications to a scheduler.

FIG. 4B illustrates a block diagram of a data structure/message format 450 used in one embodiment. Data structure 450 typically has multiple entries, each with an identification field 451 to indicate whether the entry corresponds to unicast or multicast packet indications, and a bitmap field 452 to indicate the destinations of the packets.

Figure 4C:
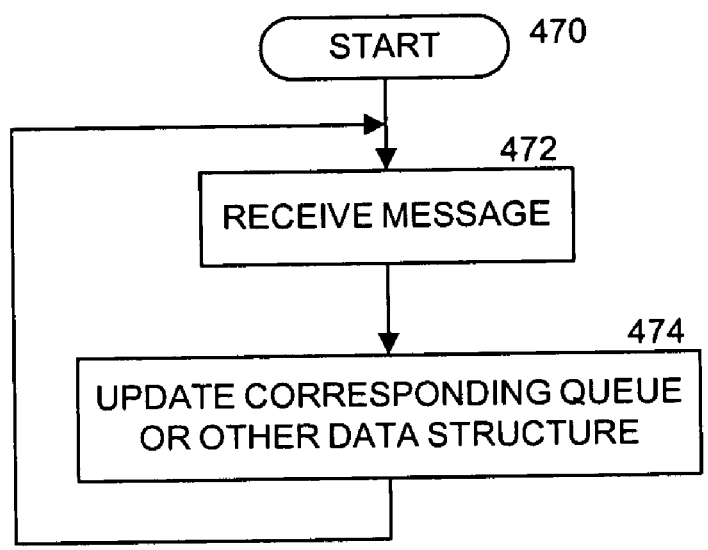

FIG. 4C illustrates a process used in one embodiment by a centralized scheduling system to collect the packet indications for the various sending line cards. Processing begins with process block 470, and proceeds to process block 472, wherein a message is received. In process block 474, one or more packet indication queues or other data structures are updated, and processing returns to process block 472.

Figure 5A:
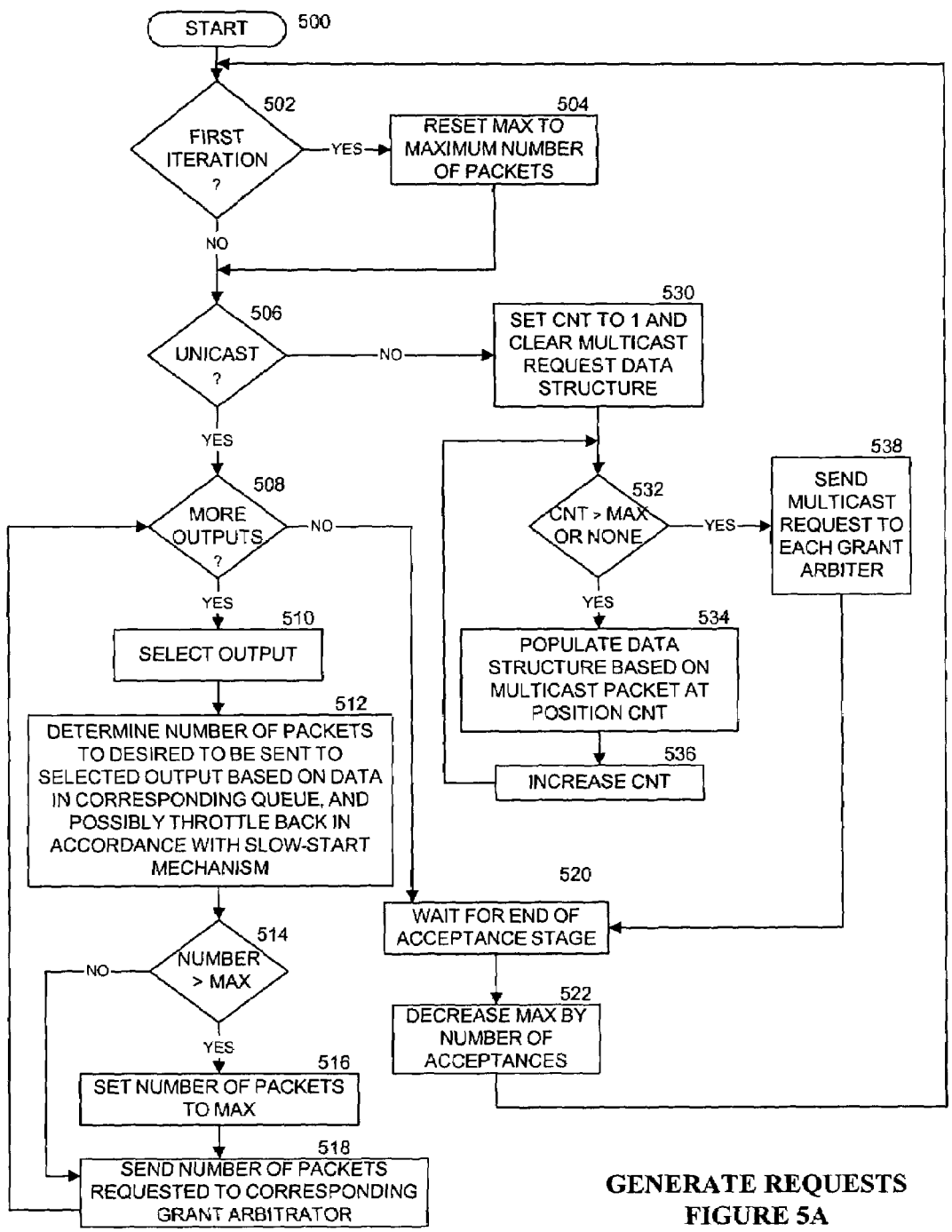
FIG. 5A is a flow diagram of a process used in one embodiment for generating requests.

FIG. 5A illustrates a process used in one embodiment by each of the request generators, typically one for each line card associated with the non-blocking packet switch. Processing begins with process block 500. As determined in process block 502, if this is a first iteration, then in process block 504, the value of MAX is set to the maximum number of packets that can be sent by the line card in a packet time, which typically corresponds to the number of switch input ports to which the line card connects. Each request generator will typically have outstanding a cumulative number of requests that it can service in a scheduling cycle.

As determined in process block 506, if this is a unicast iteration, then processing proceeds to process block 508 to indicate a set of requests to each of the grant arbiters. While there are more outputs as determined in process block 508, an output is selected in process block 510, and the number of desired packets to be sent to the particular output (up to the maximum number of packets the destination can actually receive in a packet time) is determined in process block 512. In one embodiment, the number of requests is throttled back using a slow-start mechanism.

In switches supporting heterogeneous mixes of cards (e.g., cards with different bandwidths), some performance issues can surface. For example, a scheduler used in one embodiment is designed to support a certain performance ratio between the different cards, such as that based on the relative bandwidths of the cards. In one embodiment, the ratio of bandwidths between different cards is based on the individual bandwidths supported by each of the different cards. In one embodiment, this ratio of bandwidths between different cards is proportional to the number of connections or ports to the crossbar or other switch that each can use and the number of packets/cells that that each connection or port supports.

Thus, in one embodiment, if a card can send four packets in one packet time and another card can send one packet in one packet time, then the scheduler will try to enforce a four-to-one traffic ratio when these two cards compete for the same switching resources (e.g., switching paths, outputs, etc.) If the actual traffic mix is something else, for example a three-to-one traffic ratio, the packets may be scheduled in a manner which reduces the utilization of the switching mechanism. This can be very problematic to a customer as the scheduling algorithm may not be optimized to match the customer's actual traffic mix.

This problem can be further exacerbated by the bursty nature of traffic arrivals. For example, a card capable of sending four packets in a packet time might require only seventy-five percent of the bandwidth on average (e.g., three packets or a three-to-one bandwidth ratio with a card capable of sending only one packet in a packet time). When the data arrivals to the card capable of sending four packets in a packet is bursty in nature, the requests made to a scheduler may indicated that the card requires one hundred percent of the bandwidth at certain times (e.g., when it has four packets to send) as each card generates a number of requests based on the number of packets it currently has to send.

Thus, for example, consider the case with two cards capable of sending four and one packets respectively during a packet time, with the cards sending an average of three and one packets respectively to a card capable of receiving four packets per packet time. It is therefore desired that the cards send three and one packets respectively each packet time. However, when the arrival rate of packets to a card varies (e.g., the traffic is bursty in nature), the card capable of sending four packets might have two packets to send at one time and four packets to send at another time. Because of the nature of certain schedulers, such as, but not limited to a I-SLIP scheduler or variant thereof, the scheduler might allow the card capable of sending four packets in a single packet time to actually send all four packets. In this situation, the card capable of sending one packet will be blocked from sending during this packet time (and in this example, will never be able to catch-up and eventually have to drop one or more packets).

Thus, one embodiment artificially constrains the number of requests the higher-bandwidth cards can make until they are saturated (e.g., have a number of packets exceeding a threshold value, generates a number of requests greater than a threshold value, etc.). In other words, by doing a "slow start" (delayed ramp-up of requests) on these cards, we can mitigate the starvation of lower-bandwidth cards, and thus, in one embodiment, smooth-out or average the bursty requests of the higher-bandwidth requesting cards so other cards are not starved.

Using the example describe above, in one embodiment, if the actual number of requests from the card capable of sending four packets in a packet time is less than sixteen (e.g., some saturation or other threshold value), the number of requests is possibly reduced to some number less than MAX, such as, but not limited to that by a static or adaptive reduction mechanism. In one embodiment, the number of requests is reduced to the ceiling of the number of requests divided by a constant value (e.g., divided four when the saturated value is sixteen and MAX is four, such as to reduce in a linear fashion) or possibly modified by some other dynamic or static mechanism. In one embodiment, the reduction mechanism changes over to adapt based on past traffic loads and/or time since last saturation. Otherwise, the number of packets is reduced to MAX or left alone to be reduced by to MAX such as by steps 514-516 of FIG. 5A.

Thus, in context of the previous example, until the card capable of sending four packets in a packet time is saturated (i.e., in this example, has sixteen or more requests), the scheduler will possibly consider a reduced number of requests in making its scheduling decisions. The effect this has is to provide more chances for lower bandwidth cards to be served, even in the presence of (some amount of) burstiness of the higher bandwidth card. This slow-start of requests can be selectively applied (e.g., only to higher bandwidth cards, or perhaps only in heterogeneous configurations). Also, this divide-by-four algorithm is simple to implement using a division, shift or other operation, and is just one example of an unlimited extensible number of reduction mechanisms. For example, a data structure or other table mechanism maps requests to the reduced number of requests used by the scheduler. In one embodiment, a dynamic table-based approach is used to select among different tables or as an offset within a table, such as by, but not limited dynamically changing based on some knowledge of local or system-level traffic patterns.

Figure 5B:
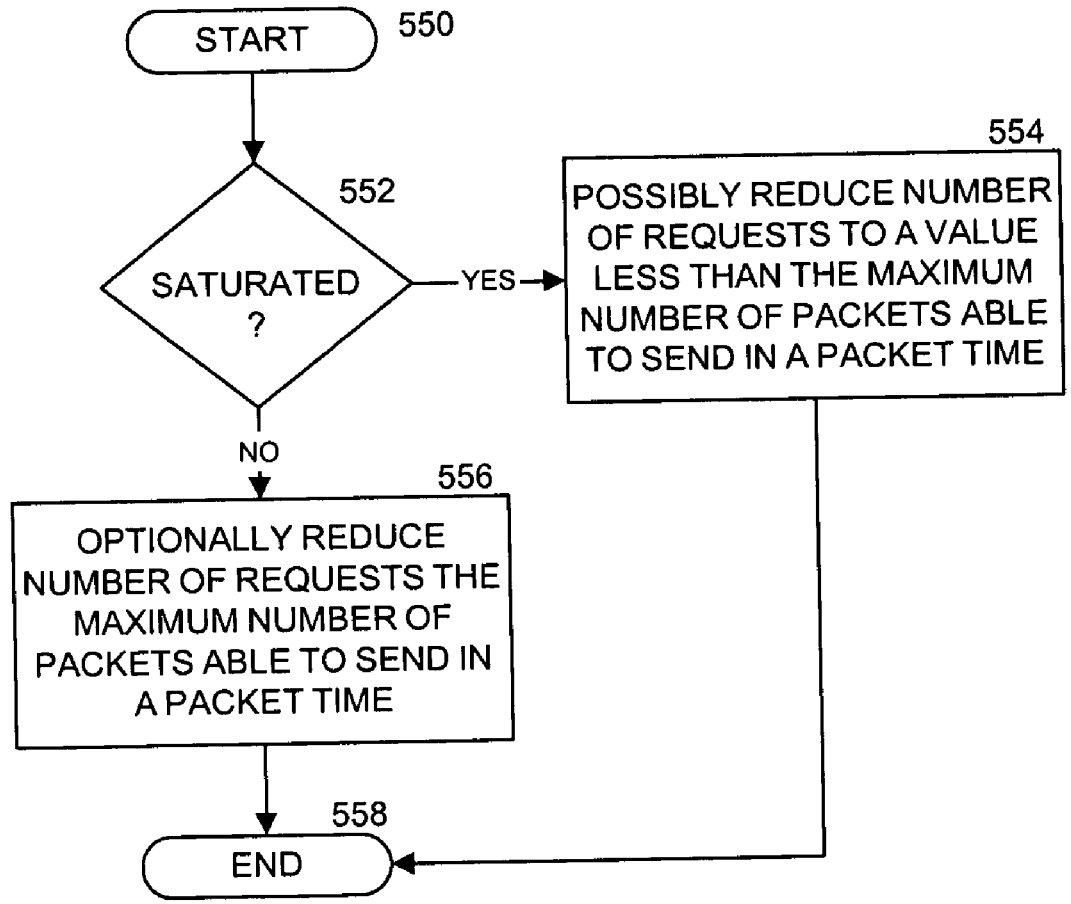
FIG. 5B is a flow diagram of a process used in one embodiment for slow-start throttling of requests.

In one embodiment, a process shown in FIG. 5B is used to slow-start adjust the number of requests generated by a source. Processing begins with process block 550. As determined in process block 552, if the source is saturated (e.g., the number of requests is greater than a threshold value, the number of packets to be sent from the source is greater than a threshold, the number of packets in a queue corresponding to the source is greater than a threshold etc.), then in process block 554, the number of requests is accordingly slow-start adjusted, possibly to some value less than the maximum number of packets that can be sent in a packet time or reduced to some other value. Otherwise, in process block 556, the number of requests is optionally reduced to the maximum number of packets that can be sent during a packet time. Processing is complete as indicated by process block 558. Note, this or any other slow-start adjustment process or mechanism can be used by any request generated discussed herein and/or illustrated in the figures.

Returning to the discussion of FIG. 5A, if the number of request is greater than the value of MAX as determined in process block 514, then this number is set to MAX in process block 516. In process block 518, the requests are signaled to the corresponding grant arbiter. After all outputs have been processed, then in process block 520, the request arbiter waits for the end of the acceptance stage of the current unicast iteration. Then, in process block 522, MAX is decreased by the number of acceptances corresponding to the previously sent requests from this request arbiter in this iteration, and processing returns to process block 502.

If, as determined in process block 506, that this is a multicast iteration, then processing proceeds to process block 530 to set CNT to one and to clear the multicast request data structure. While CNT is not greater than MAX and there are multicast requests to process as determined in process block 532, processing blocks 534 and 536 are performed. In process block 534, a data structure is populated based on the destinations of the multicast packet at position CNT in the multicast queue, and CNT is increased by one in process block 536. When done, processing proceeds to process block 538 to send a multicast request to each grant arbiter (of course, it could be a request of no multicast packets) or at least those grant arbiters with a pending multicast request from this request generator. Processing then proceeds to process block 520.

Figure 6A:
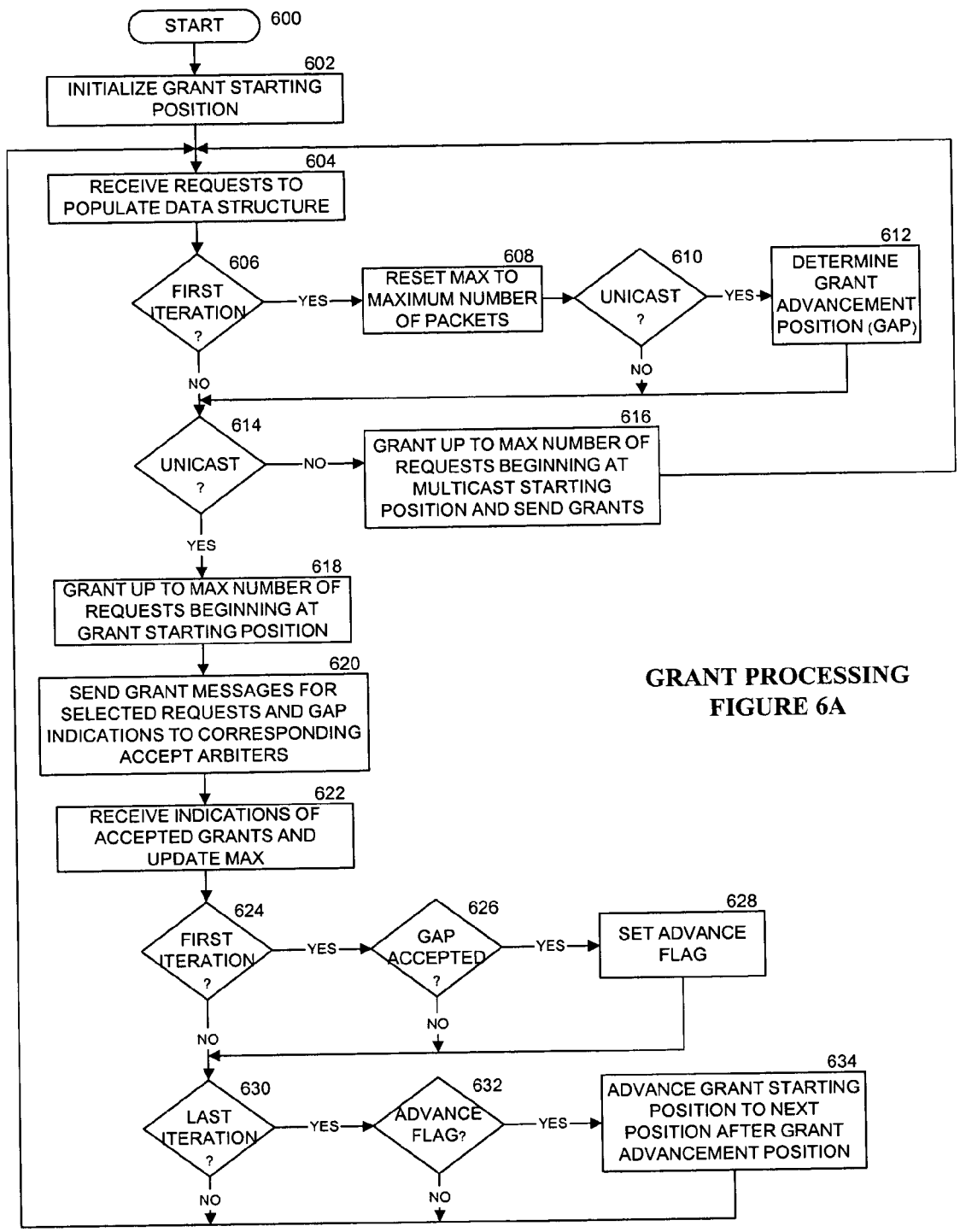
FIG. 6A is a flow diagram of a process used in one embodiment in performing grant processing.
Figure 6B:
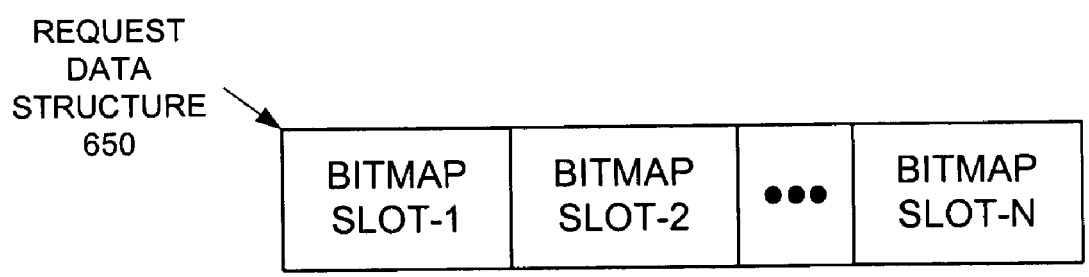
FIGS. 6B-C are block diagrams of data structures used in one embodiment in performing grant processing.

FIG. 6A illustrates a flow diagram of a process used by a grant arbiter in one embodiment. Processing begins with process block 600, and proceeds to process block 602, wherein a grant starting position is initialized. Next, in process block 604, the requests are received from the request generators, with these requests used to populate a data structure. In one embodiment, data structure 650 illustrated in FIG. 6B is used, with data structure 650 including a bitmap unary representation of the number of requests received for each slot (e.g., from each request generator).

In one embodiment, these bitmap representations are right-aligned as illustrated in data structure 660. In one embodiment, these bitmap representations are left-aligned, while in one embodiment, these bitmap representations are maintained in a manner representative of the physical ports of the line card or slot. The alignment of the requesting bits within such a bitmap typically impacts packet scheduling by affecting the updating of the grant starting position. When the bitmap is right-aligned, the starting position for selecting bits (e.g., bits corresponding to grants or acceptances) is more likely to advance to bits corresponding to a next line card or slot. However, this rate of advancement is still throttled by, inter alia, the traffic rate of the line card and switch throughput as indicated by the generation rate of requests, grants, and acceptances, as well as the line cards and ports corresponding to the particular requests, grants, and acceptances.

Returning to the processing of FIG. 6A, as determined in process block 606, if this is a first iteration of the current scheduling round, then in process block 608, MAX is set to the maximum number of packets which can be received in one packet time by the line card corresponding to this grant arbiter. Next, as determined in process block 610, if this is a unicast iteration, then in process block 612, the grant advancement position (GAP) is determined. If a grant corresponding to the grant advancement position is accepted during the first iteration (or in any iteration in one embodiment), then the grant starting position will be modified so grants will be generated starting from a different position in a next scheduling round.

Figure 6C:
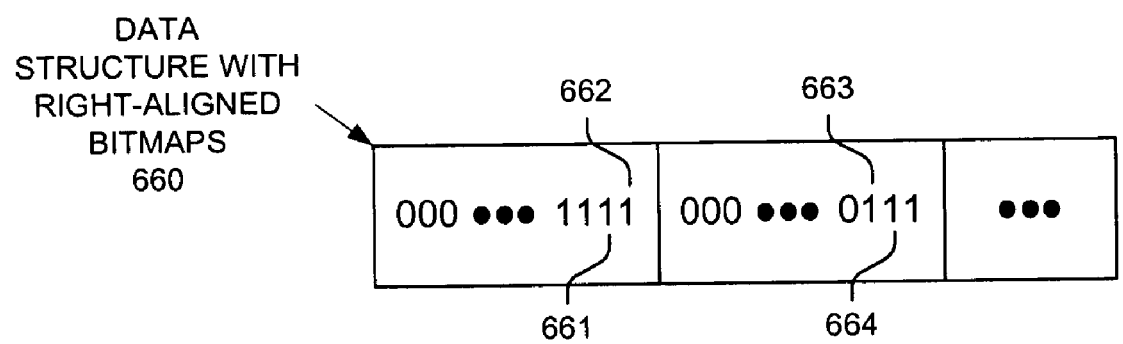

In one embodiment, the grant advancement position is the first position in the request data structure indicating a request after the grant starting position. Referring back to FIG. 6C, data structure 660 illustrates two right-aligned bitmaps. If the grant starting position is at position 661, then the grant advancement position is at position 662. If the grant starting position is at position 662, then the grant advancement position is at position 663. If the grant starting position is at position 663, then the grant advancement position is at position 664.

Returning to the processing of FIG. 6A and process block 614, if the iteration is not a unicast iteration, then in process block 616, up to MAX multicast requests are generated beginning at the multicast pointer position (common among all grant arbiters in one embodiment), and these grants are sent to the corresponding acceptance arbiters.

Otherwise, in process block 618, up to MAX unicast grants are generated beginning at the grant starting position. Next, in process block 620, these generated grants, along with an indication of whether a grant at the grant advancement position is included, are sent to the corresponding acceptance arbiters. Next, in process block 622, indications of the accepted grants are received, and MAX is decreased by the number of accepted grants generated by this grant arbiter. If, as determined in process block 624, this is a first iteration of the current scheduling cycle, then as determined in process block 626, if the packet at the grant advancement position was accepted, then the advance flag is set in process block 628. As determined in process block 630, if this is a last iteration of the current scheduling cycle, then as determined in process block 632, if the advance flag is set, then in process block 634, the grant starting position is advanced to the next position after the grant advancement position. Processing then returns to process block 604.

Figure 7A:
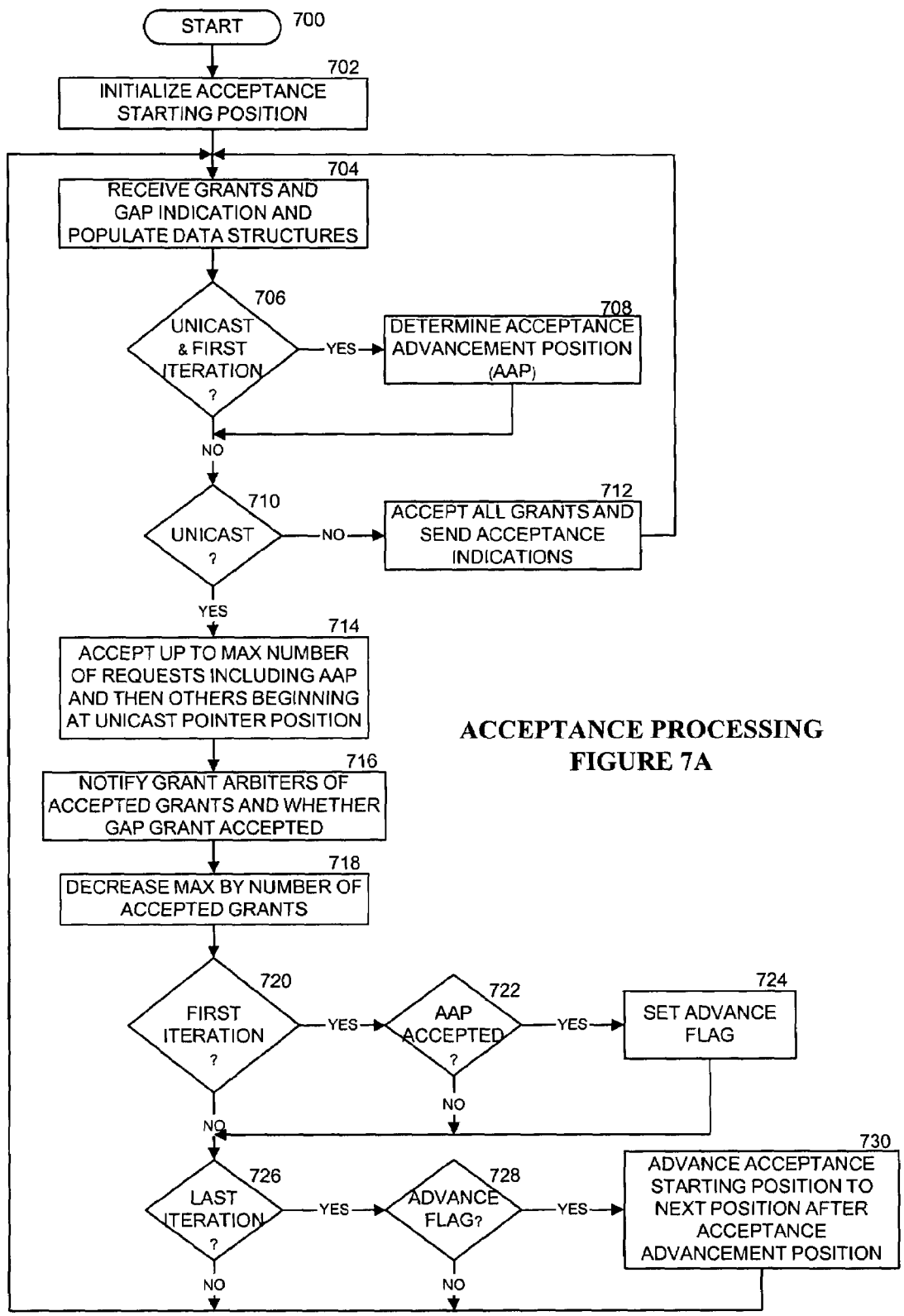
FIG. 7A is a flow diagram of a process used in one embodiment for performing acceptance processing.
Figure 7B:
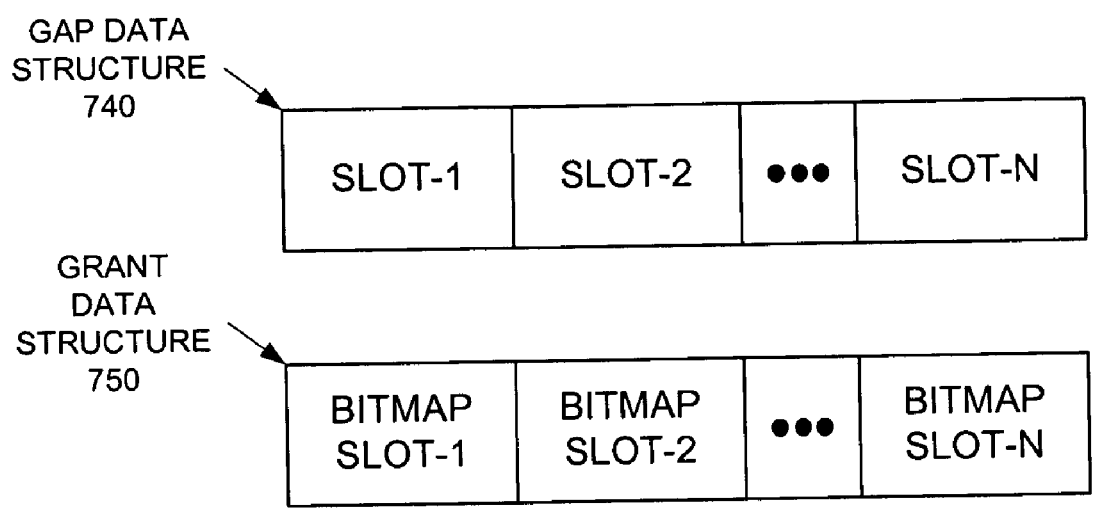
FIG. 7B illustrates block diagrams of data structures used in one embodiment for performing acceptance processing.

FIG. 7A illustrates a flow diagram of a process used by an acceptance arbiter in one embodiment. Processing begins with process block 700, and proceeds to process block 702, wherein an acceptance starting position is initialized. Next, in process block 704, the grants and grant advancement position indicators are received from the grant arbiters, with this data being used to populate one or more data structures. In one embodiment, GAP data structure 740 illustrated in FIG. 7B is used to maintain the grant acceptance indications for each of the grant arbiters (corresponding to line card slots in one embodiment), and grant data structure 750 including a bitmap unary representation of the number of grants received for each slot (e.g., from each request generator). These bitmaps may or may not be right-aligned.

Returning to the processing of FIG. 7A and process block 706, if this is a unicast iteration and a first iteration of the scheduling cycle, then in process block 708, the acceptance advancement position is typically determined in the same manner as that for the grant advancement position as described herein.

Next, as determined in process block 710, if this is a multicast iteration, then in process block 712, all grants are accepted (as a sending line card does not send more multicast requests than it can service), acceptance indications are transmitted, and processing returns to process block 704.

Otherwise, in process block 714, up to MAX unicast grants are accepted beginning with the grant at the acceptance advancement position, then grants from the grant starting position. Next, in process block 716, the corresponding grant arbiters are notified of their accepted grants and whether their GAP grant was accepted. Next, in process block 718, MAX is decreased by the number of accepted grants generated by this acceptance arbiter. If, as determined in process block 720, this is a first iteration of the current scheduling cycle, then as determined in process block 722, if the grant at the acceptance advancement position was accepted, then the advance flag is set in process block 724. As determined in process block 726, if this is a last iteration of the current scheduling cycle, then as determined in process block 728, if the advance flag is set, then in process block 730, the acceptance starting position is advanced to the next position after the acceptance advancement position. Processing then returns to process block 704.

Figure 8:
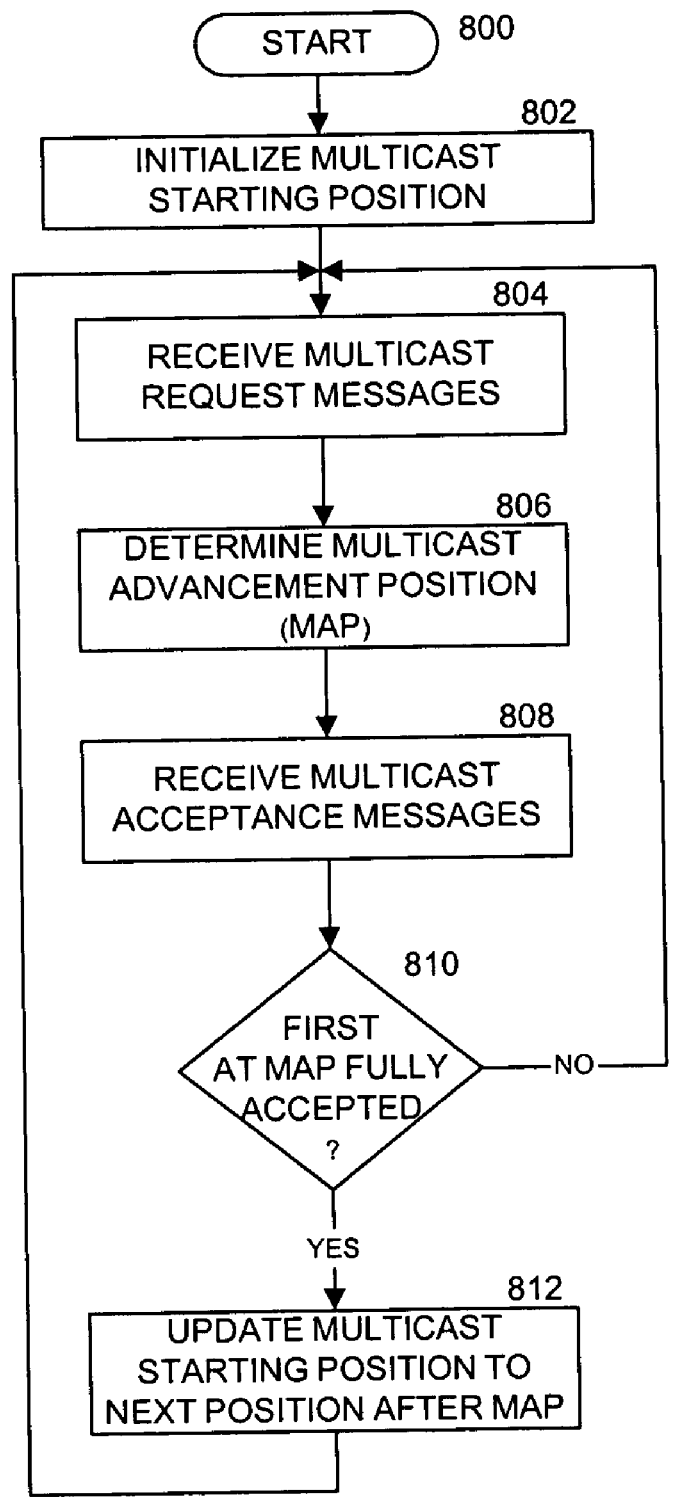
FIG. 8 is a flow diagram of a process used in one embodiment for multicast pointer processing.

FIG. 8 illustrates a process used in one embodiment by a multicast control to update the multicast pointer. Processing begins at process block 800, and proceeds to process block 802, wherein the multicast starting position is initialized. Next, in process block 804, multicast request messages are received from the various request generators. In process block 806, the multicast advancement position is set to the next position having a multicast request at or after the multicast starting position. In process block 808, multicast acceptance indications are received. As determined in process block 810, if all the requests for the multicast packet at the head of the queue corresponding to the multicast starting position were accepted (e.g., the first multicast packet to be sent from the input corresponding to the MAP position was fully accepted), then in process block 812, the multicast starting position is set to the next position after the multicast advancement position. Processing returns to process block 804.

Figure 9:
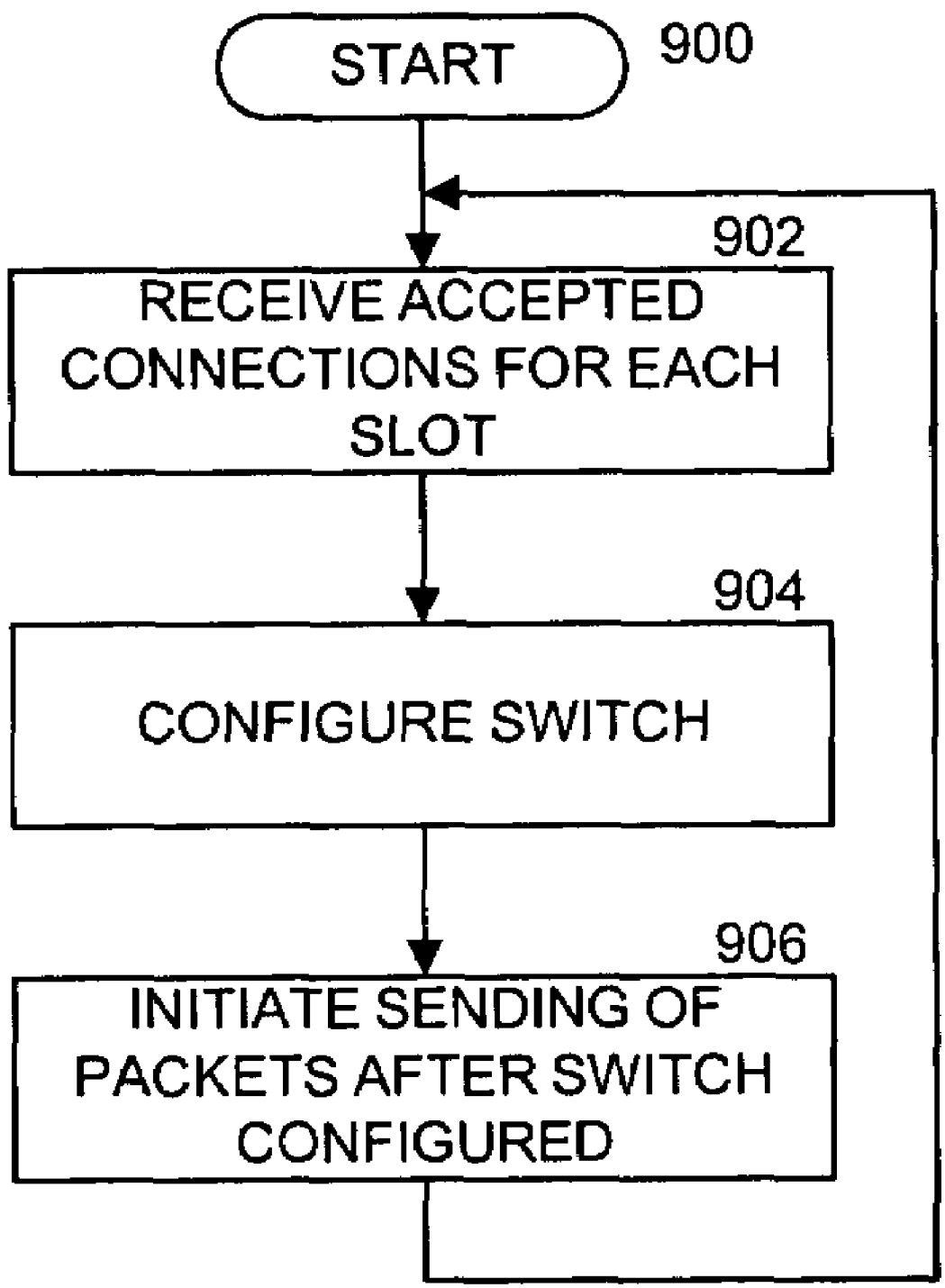
FIG. 9 is a block diagram used in one embodiment for configuring the switch and initiating the sending of packets across the switch.

FIG. 9 illustrates a process used in one embodiment for configuring a switch (e.g., non-blocking switch fabric) and sending of the accepted packets. Processing begins with process block 900, and proceeds to process block 902, wherein indications of the accepted connection are received. In process block 904, the switch is configured at the appropriate time to connect the appropriate input and output ports of the switch corresponding to the accepted requests. Then, in process block 906, sending of the packets are initiated and sent. Processing returns to process block 902.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
    identifying a set of requests corresponding to packets desired to be sent from a plurality of inputs across a packet switch to a particular output, the set of requests including j requests from a particular source with the ability to send k packets during a particular packet time and having a saturation level of s packets;
    slow-start adjusting the value of said j to a slow-start value, wherein the slow-start value is less than said k when a number of packets corresponding to the particular source is less than said s;
    maintaining a grant starting position;
    determining a grant advancement position;
    identifying a first n requests in a predetermined sequence starting from the grant starting position, where n is less than or equal to the maximum number of packets that can be sent in a single packet time to the particular output; and wherein the first n requests include the slow-start value number of requests from the particular source; and
    updating the grant starting position in response to the first n grants including a particular grant corresponding to the grant advancement position.

2. The method of claim 1, wherein said slow-start adjusting the value of said j to the slow-start value includes setting the slow-start value to said k when the number of packets corresponding to the particular source is greater than said s.

3. The method of claim 1, wherein said slow-start adjusting the value of said j to the slow-start value includes a division or shift operation by a predetermined value on said j when the number of packets corresponding to the particular source is less than said s.

4. The method of claim 1, wherein said slow-start adjusting the value of said j to the slow-start value includes identifying the slow-start value in a data structure based on the value of said j.

5. An apparatus, comprising:
a plurality of request generators;
a plurality of grant arbiters coupled to the plurality of request generators;
a plurality of acceptance arbiters coupled to the plurality of grant arbiters;
wherein each of the plurality of request generators is configured for generating requests for its associated input of a plurality of inputs of a switch, wherein said requests include j requests from a particular source with the ability to send k packets during a particular packet time and having a saturation level of s packets, and a request generator corresponding to the particular source of the plurality of request generators is configured to slow-start adjust the value of said j to a slow-start value, wherein the slow-start value is less than said k when a number of packets corresponding to the particular source is less than said s;
wherein each of the plurality of grant arbiters is configured for generating grants based on one or more received requests, said grants corresponding to authorization to send to its associated output of a plurality of outputs of the switch, where said generating grants includes maintaining a grant starting position, determining a grant advancement position, identifying a first n requests in a predetermined sequence starting from the grant starting position, where n is less than or equal to the maximum number of packets that can be sent in a single packet time to said associated output; and updating the grant starting position in response to the first n grants including a particular grant corresponding to the grant advancement position; and
wherein each of the plurality of acceptance arbiters is configured for generating acceptances based on one or more received grants, said acceptances corresponding to its associated input of the plurality of inputs.

6. The apparatus of claim 5, wherein the request generator corresponding to the particular source is configured to set the slow-start value to said k when the number of packets corresponding to the particular source is greater than said s.

7. A computer-readable medium tangibly storing thereon computer-executable instructions for performing steps when executed by a computer, said steps comprising:
identifying a set of requests corresponding to packets desired to be sent from a plurality of inputs across a packet switch to a particular output, the set of requests including i requests from a particular source with the ability to send k packets during a particular packet time and having a saturation level of s packets;
slow-start adjusting the value of said j to a slow-start value, wherein the slow-start value is less than said k when a number of packets corresponding to the particular source is less than said s;
maintaining a grant starting position;
determining a grant advancement position;
identifying a first n requests in a predetermined sequence starting from the grant starting position, where n is less than or equal to the maximum number of packets that can be sent in a single packet time to the particular output; and wherein the first n requests include the slow-start value number of requests from the particular source; and
updating the grant starting position in response to the first n grants including a particular grant corresponding to the grant advancement position.

8. The computer-readable medium of claim 7, wherein said slow-start adjusting the value of said j to the slow-start value includes setting the slow-start value to said k when the number of packets corresponding to the particular source is greater than said s.

9. The computer-readable medium of claim 7, wherein said slow-start adjusting the value of said j to the slow-start value includes a division or shift operation by a predetermined value on said j when the number of packets corresponding to the particular source is less than said s.

10. The computer-readable medium of claim 7, wherein said slow-start adjusting the value of said j to the slow-start value includes identifying the slow-start value in a data structure based on the value of said j.

11. An apparatus, comprising:
means for identifying a set of requests corresponding to packets desired to be sent from a plurality of inputs across a packet switch to a particular output, the set of requests including j requests from a particular source with the ability to send k packets during a particular packet time and having a saturation level of s packets;
means for slow-start adjusting the value of said j to a slow-start value, wherein the slow-start value is less than said k when a number of packets corresponding to the particular source is less than said s;
means for maintaining a grant starting position;
means for determining a grant advancement position;
means for identifying a first n requests in a predetermined sequence starting from the grant starting position, where n is less than or equal to the maximum number of packets that can be sent in a single packet time to the particular output; and wherein the first n requests include the slow-start value number of requests from the particular source; and
means for updating the grant starting position in response to the first n grants including a particular grant corresponding to the grant advancement position.

12. The apparatus of claim 11, wherein said means for slow-start adjusting the value of said j to the slow-start value includes means for setting the slow-start value to said k when the number of packets corresponding to the particular source is greater than said s.

13. The apparatus of claim 11, wherein said means for slow-start adjusting the value of said j to the slow-start value includes means for performing a division or shift operation by a predetermined value on said j when the number of packets corresponding to the particular source is less than said s.

14. The apparatus of claim 11, wherein said means for slow-start adjusting the value of said j to the slow-start value includes means for identifying the slow-start value in a data structure based on the value of said j.

* * * * *

UNITED STATES PATENT AND TRADEMARK OFFICE
CERTIFICATE OF CORRECTION

| | | |
|---|---|---|
| PATENT NO. | : 7,289,443 B1 | Page 1 of 1 |
| APPLICATION NO. | : 10/684282 | |
| DATED | : October 30, 2007 | |
| INVENTOR(S) | : Patrick A. Costello | |

It is certified that error appears in the above-identified patent and that said Letters Patent is hereby corrected as shown below:

Col. 15, line 58, replace "i requests" with --j requests--

Signed and Sealed this

Twenty-fourth Day of November, 2009

David J. Kappos
*Director of the United States Patent and Trademark Office*